US012577998B2

(12) United States Patent (10) Patent No.: US 12,577,998 B2
Jarman (45) Date of Patent: Mar. 17, 2026

(54) MATERIAL LIFE EXTENSION FOR REFURBISHED 2-FOR-1 CARBON BRAKES VIA CERAMIC SOLUTIONS

(71) Applicant: GOODRICH CORPORATION, Charlotte, NC (US)

(72) Inventor: Jecee Jarman, Pueblo, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 249 days.

(21) Appl. No.: 18/474,607

(22) Filed: Sep. 26, 2023

(65) Prior Publication Data

US 2025/0102032 A1 Mar. 27, 2025

(51) Int. Cl.
*C04B 41/45* (2006.01)
*C04B 35/83* (2006.01)
(Continued)

(52) U.S. Cl.
CPC ............ *F16D 69/023* (2013.01); *C04B 35/83* (2013.01); *C04B 41/4543* (2013.01);
(Continued)

(58) Field of Classification Search
CPC ......... F16D 69/0023; F16D 2200/0047; F16D 2200/0065; F16D 2200/0046;
(Continued)

(56) References Cited

U.S. PATENT DOCUMENTS 3,871,934 A 3/1975 Marin
4,180,622 A 12/1979 Burkhard et al.
(Continued)

FOREIGN PATENT DOCUMENTS

CN 110305504 10/2020
CN 110981518 1/2021
(Continued)

OTHER PUBLICATIONS

European Patent Office, European Search Report dated Jun. 12, 2025 in Application No. 24202053.5.
(Continued)

*Primary Examiner* — Michael P Wieczorek
(74) *Attorney, Agent, or Firm* — SNELL & WILMER L.L.P.

(57) ABSTRACT

A method is provided for refurbishing a C/C disk of a first thickness and coated with a first ceramic solution for a second life. The method includes machining the C/C disk of the first thickness to remove a coating of the first ceramic solution from the wear surfaces of the C/C disk of the first thickness. Removing the coating of the first ceramic solution further removes a portion of the C/C disk thereby forming a C/C disk of a second thickness. The second thickness is less than the first thickness. The method further includes coating the wear surfaces of the C/C disk of the second thickness with a second ceramic solution, thereby forming a C/C disk of the second thickness coated with the second ceramic solution. Additionally, the method includes drying the C/C disk of the second thickness coated with the second ceramic solution.

20 Claims, 5 Drawing Sheets

(51) Int. Cl.

| | | |
|---|---|---|
| *C04B 41/50* | (2006.01) | |
| *C04B 41/87* | (2006.01) | |
| *F16D 69/02* | (2006.01) | |

(52) U.S. Cl.
CPC .......... *C04B 41/5025* (2013.01); *C04B 41/87* (2013.01); *F16D 2200/0047* (2013.01); *F16D 2200/0065* (2013.01); *F16D 2250/0046* (2013.01)

(58) Field of Classification Search
CPC ..... F16D 65/0043; F16D 65/12; C04B 35/83; C04B 41/4543; C04B 41/5025; C04B 41/87; C04B 41/5338; C04B 41/5346
See application file for complete search history.

(56) References Cited

U.S. PATENT DOCUMENTS

| | | | |
|---|---|---|---|
| 5,224,572 | A | 7/1993 | Smolen, Jr. et al. |
| 5,629,101 | A | 5/1997 | Watremez |
| 5,962,135 | A | 10/1999 | Walker et al. |
| 6,857,509 | B1 | 2/2005 | Braiato et al. |
| 6,969,546 | B2 | 11/2005 | DiChiara, Jr. |
| 7,501,181 | B2 | 3/2009 | Walker et al. |
| 7,900,751 | B2 * | 3/2011 | Walker ................ F16D 65/0043 188/71.7 |
| 8,084,089 | B2 | 12/2011 | Meckel |
| 8,449,943 | B2 | 5/2013 | Meckel |
| 8,871,044 | B2 | 10/2014 | Baud et al. |
| 8,962,083 | B2 | 2/2015 | Murphy |
| 9,296,660 | B2 | 3/2016 | Miyamoto et al. |
| 10,670,099 | B2 | 6/2020 | Yaguchi et al. |
| 10,767,059 | B2 | 9/2020 | Poteet et al. |
| 11,634,213 | B2 | 4/2023 | Poteet et al. |
| 2009/0130324 | A1 | 5/2009 | Shanker et al. |
| 2010/0291373 | A1 | 11/2010 | Baud et al. |
| 2013/0116109 | A1 | 5/2013 | Ritti |
| 2013/0337180 | A1 | 12/2013 | Jacquemard |
| 2014/0054810 | A1 * | 2/2014 | Cho ...................... F16D 69/023 264/36.18 |
| 2015/0354936 | A1 | 12/2015 | Thomas et al. |
| 2019/0092698 | A1 | 3/2019 | Kirkpatrick |
| 2020/0200227 | A1 | 6/2020 | Linck |
| 2021/0362368 | A1 | 11/2021 | Diss |
| 2023/0150884 | A1 | 5/2023 | Khan |

FOREIGN PATENT DOCUMENTS

| | | | | |
|---|---|---|---|---|
| CN | 109384470 | 6/2021 | | |
| CN | 113045324 | 6/2021 | | |
| CN | 113045324 A * | 6/2021 | .......... | C09D 201/00 |
| CN | 110937910 | 9/2021 | | |
| CN | 115385711 | 11/2022 | | |
| CN | 113277869 | 3/2023 | | |
| CN | 115773321 | 3/2023 | | |
| EP | 1845075 | 10/2007 | | |
| EP | 3248957 | 11/2017 | | |
| EP | 3459923 | 3/2019 | | |
| EP | 3805187 | 4/2021 | | |
| EP | 4180408 | 5/2023 | | |
| EP | 4223725 | 8/2023 | | |
| FR | 2967170 | 5/2012 | | |
| GB | 2485673 | 5/2012 | | |
| JP | 5051286 | 3/1993 | | |
| JP | 07043930 | 3/2022 | | |
| WO | 2008075055 | 6/2008 | | |
| WO | 2009127517 | 10/2009 | | |

OTHER PUBLICATIONS

USPTO; Non-Final Office Action dated Jul. 18, 2025 in U.S. Appl. No. 18/483,429.

European Patent Office, European Search Report dated Feb. 5, 2025 in Application No. 241987270.

European Patent Office, European Search Report dated Feb. 19, 2025in Application No. 242030484.

European Patent Office, European Search Report dated Feb. 25, 2025in Application No. 242050847.

USPTO; Requirement for Restriction/ Election dated Mar. 4, 2025 in U.S. Appl. No. 18/461,433.

USPTO; Requirement for Restriction/ Election dated Apr. 14, 2025 in U.S. Appl. No. 18/483,429.

European Patent Office, European Search Report dated Jun. 5, 2025 in Application No. 24202523.7.

USPTO; Non-Final Office Action dated May 21, 2025 in U.S. Appl. No. 18/461,433.

European Patent Office, Partial European Search Report dated Mar. 13, 2025 in Application No. 24202523.7.

USPTO; Notice of Allowance dated Oct. 21, 2025 in U.S. Appl. No. 18/461,433.

USPTO; Non-Final Office Action dated Nov. 4, 2025 in U.S. Appl. No. 18/483,429.

USPTO; Non-Final Office Action dated Sep. 4, 2025 in U.S. Appl. No. 18/483,367.

USPTO; Notice of Allowance dated Dec. 1, 2025 in U.S. Appl. No. 18/461,433.

* cited by examiner

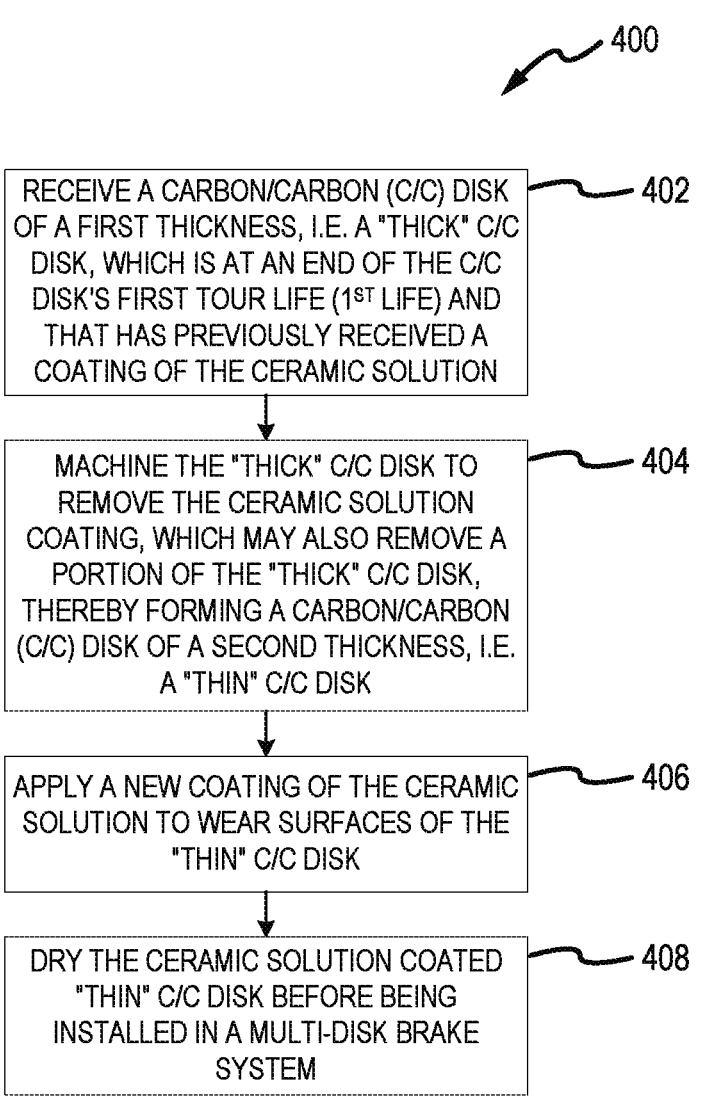

400

RECEIVE A CARBON/CARBON (C/C) DISK OF A FIRST THICKNESS, I.E. A "THICK" C/C DISK, WHICH IS AT AN END OF THE C/C DISK'S FIRST TOUR LIFE (1ST LIFE) AND THAT HAS PREVIOUSLY RECEIVED A COATING OF THE CERAMIC SOLUTION
— 402

MACHINE THE "THICK" C/C DISK TO REMOVE THE CERAMIC SOLUTION COATING, WHICH MAY ALSO REMOVE A PORTION OF THE "THICK" C/C DISK, THEREBY FORMING A CARBON/CARBON (C/C) DISK OF A SECOND THICKNESS, I.E. A "THIN" C/C DISK
— 404

APPLY A NEW COATING OF THE CERAMIC SOLUTION TO WEAR SURFACES OF THE "THIN" C/C DISK
— 406

DRY THE CERAMIC SOLUTION COATED "THIN" C/C DISK BEFORE BEING INSTALLED IN A MULTI-DISK BRAKE SYSTEM
— 408

FIG. 4

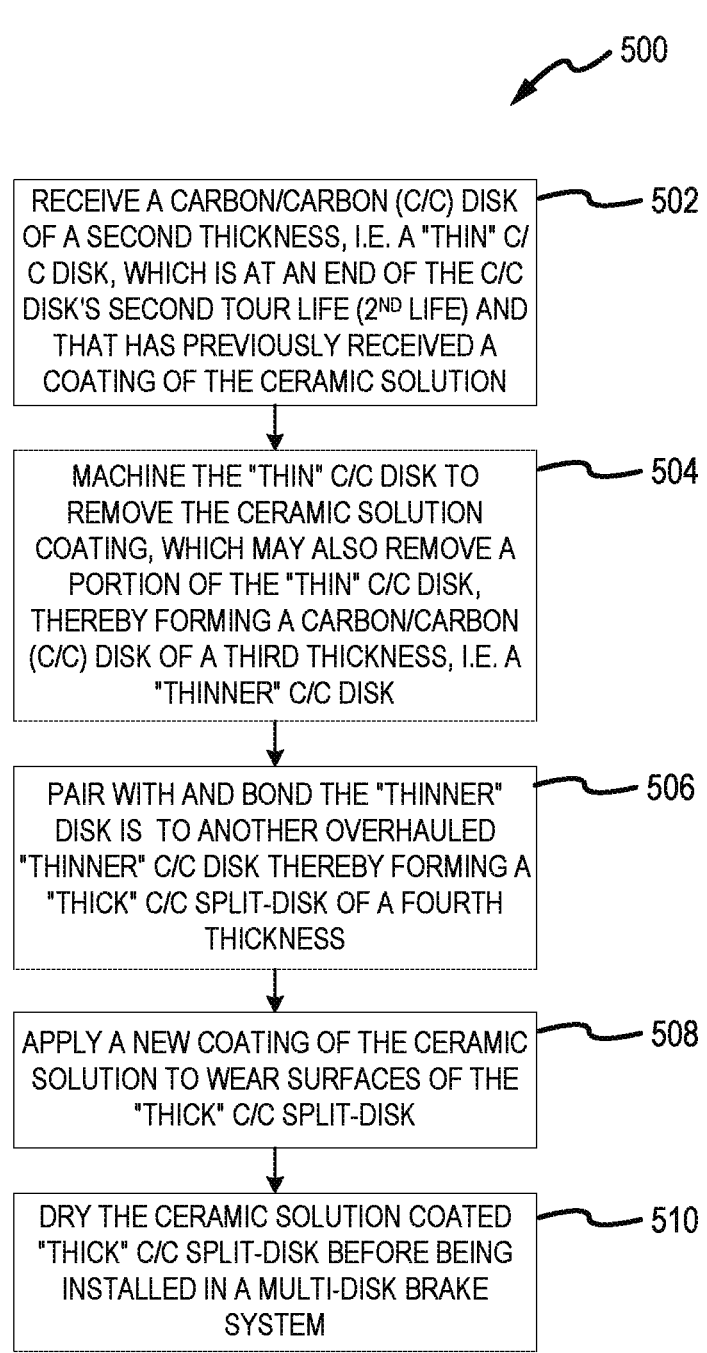

500

RECEIVE A CARBON/CARBON (C/C) DISK OF A SECOND THICKNESS, I.E. A "THIN" C/C DISK, WHICH IS AT AN END OF THE C/C DISK'S SECOND TOUR LIFE (2ND LIFE) AND THAT HAS PREVIOUSLY RECEIVED A COATING OF THE CERAMIC SOLUTION — 502

MACHINE THE "THIN" C/C DISK TO REMOVE THE CERAMIC SOLUTION COATING, WHICH MAY ALSO REMOVE A PORTION OF THE "THIN" C/C DISK, THEREBY FORMING A CARBON/CARBON (C/C) DISK OF A THIRD THICKNESS, I.E. A "THINNER" C/C DISK — 504

PAIR WITH AND BOND THE "THINNER" DISK IS TO ANOTHER OVERHAULED "THINNER" C/C DISK THEREBY FORMING A "THICK" C/C SPLIT-DISK OF A FOURTH THICKNESS — 506

APPLY A NEW COATING OF THE CERAMIC SOLUTION TO WEAR SURFACES OF THE "THICK" C/C SPLIT-DISK — 508

DRY THE CERAMIC SOLUTION COATED "THICK" C/C SPLIT-DISK BEFORE BEING INSTALLED IN A MULTI-DISK BRAKE SYSTEM — 510

FIG. 5

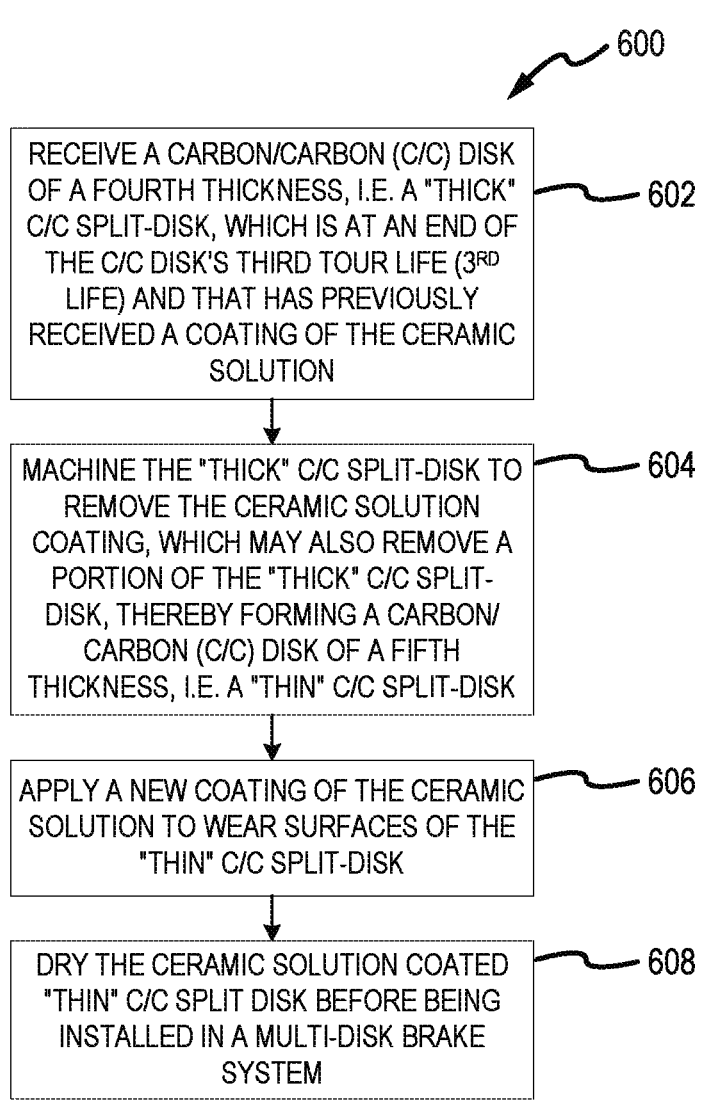

600

RECEIVE A CARBON/CARBON (C/C) DISK OF A FOURTH THICKNESS, I.E. A "THICK" C/C SPLIT-DISK, WHICH IS AT AN END OF THE C/C DISK'S THIRD TOUR LIFE (3$^{RD}$ LIFE) AND THAT HAS PREVIOUSLY RECEIVED A COATING OF THE CERAMIC SOLUTION — 602

MACHINE THE "THICK" C/C SPLIT-DISK TO REMOVE THE CERAMIC SOLUTION COATING, WHICH MAY ALSO REMOVE A PORTION OF THE "THICK" C/C SPLIT-DISK, THEREBY FORMING A CARBON/CARBON (C/C) DISK OF A FIFTH THICKNESS, I.E. A "THIN" C/C SPLIT-DISK — 604

APPLY A NEW COATING OF THE CERAMIC SOLUTION TO WEAR SURFACES OF THE "THIN" C/C SPLIT-DISK — 606

DRY THE CERAMIC SOLUTION COATED "THIN" C/C SPLIT DISK BEFORE BEING INSTALLED IN A MULTI-DISK BRAKE SYSTEM — 608

FIG. 6

MATERIAL LIFE EXTENSION FOR REFURBISHED 2-FOR-1 CARBON BRAKES VIA CERAMIC SOLUTIONS

FIELD

The present disclosure relates generally to aircraft carbon brakes and, more specifically, to extending the material life of refurbished 2-for-1 carbon brakes via ceramic solutions.

BACKGROUND

Aircraft typically utilize brake systems on wheels to slow or stop the aircraft during landings, taxiing, and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

SUMMARY

A method for refurbishing a C/C disk of a first thickness and coated with a first ceramic solution for a second life is disclosed. The method includes machining the C/C disk of the first thickness to remove a coating of the first ceramic solution from the wear surfaces of the C/C disk of the first thickness thereby forming a C/C disk of a second thickness and wherein the second thickness is less than the first thickness; coating the wear surfaces of the C/C disk of the second thickness with a second ceramic solution, thereby forming a C/C disk of the second thickness coated with the second ceramic solution; and drying the C/C disk of the second thickness coated with the second ceramic solution.

In various embodiments, removing the coating of the first ceramic solution from the wear surfaces of the C/C disk of the first thickness further removes a portion of the C/C disk. In various embodiments, the second ceramic solution is applied to a wear surface of the C/C disk of the second thickness via at least one of spraying, painting, smearing, brushing, sorption, cold spraying, sputtering, pouring, sprinkling, peptization, or infiltration. In various embodiments, the second ceramic solution comprises at least one of nano ceramic binary oxide particulates, doped nano ceramic binary oxide particulates, or nano ceramic ternary oxide particulates.

In various embodiments, the nano ceramic binary oxide particulates comprise at least one of zirconium dioxide ($ZrO_2$), aluminum oxide ($Al_2O_3$), or magnesium oxide (MgO). In various embodiments, the nano ceramic binary oxide particulates comprise at least one of lithium oxide ($Li_2O$), beryllium oxide (BeO), calcium oxide (CaO), strontium oxide (SrO), or barium oxide (BaO). In various embodiments, the nano ceramic binary oxide particulates comprise at least one of scandium (III) oxide ($Sc_2O_3$), yttrium oxide ($Y_2O_3$), cobalt (II) oxide (CoO), or nickel oxide (NiO). In various embodiments, the nano ceramic binary oxide particulates comprise at least one of silicon oxide ($SiO_2$), titanium oxide ($TiO_2$), zirconium oxide ($ZrO_2$), or hafnium (IV) oxide ($HfO_2$). In various embodiments, the nano ceramic binary oxide particulates comprise at least one of vanadium (II) oxide (VO), vanadium (III) oxide ($V_2O_3$), vanadium oxide ($VO_2$), niobium (II) oxide (NbO), tantalum oxide ($Ta_2O_5$), tungsten (IV) oxide ($WO_2$), or tungsten trioxide ($WO_3$). In various embodiments, the nano ceramic binary oxide particulates comprise at least one of gallium oxide (GaO), indium oxide ($In_2O_3$), or tin (IV) oxide ($SnO_2$). In various embodiments, the nano ceramic binary oxide particulates comprise at least one of lanthanum oxide ($La_2O_3$), cerium dioxide ($CeO_2$), praseodymium (III, IV) oxide ($Pr_6O_{11}$), or neodymium oxide ($Nd_2O_3$). In various embodiments, the nano ceramic binary oxide particulates comprise at least one of samarium oxide ($Sm_2O_3$), europium oxide ($Eu_2O_3$), gadolinium oxide ($Gd_2O_3$), terbium oxide ($Tb_2O_3$), or dysprosium oxide ($Dy_2O_3$). In various embodiments, the nano ceramic binary oxide particulates comprise at least one of holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$). In various embodiments, the doped nano ceramic binary oxide particulates comprise at least one of yttrium oxide stabilized zirconium (IV) oxide (YSZ) or zirconium (IV) oxide toughened aluminum oxide (ZTA). In various embodiments, the nano ceramic ternary oxide particulates comprise at least one of lithium silicate ($Li_2SiO_3$), mullite ($Si_2Al_6O_{13}$), calcium silicate ($Ca_2SiO_4$), or hafnium orthosilicate ($HfSiO_4$). In various embodiments, the nano ceramic ternary oxide particulates comprise at least one of lithium titanate ($Li_2TiO_3$), aluminum titanate ($Al_2TiO_5$), calcium titanate ($CaTiO_3$), strontium titanate ($SrTiO_3$), barium titanate ($BaTiO_3$), or hafnium titanate ($HfTiO_4$). In various embodiments, the nano ceramic ternary oxide particulates comprise at least one of strontium zirconate ($SrZrO_3$) or barium zirconate ($BaZrO_3$).

Also disclosed herein is a method for refurbishing a C/C disk of a second thickness and coated with a second ceramic solution for a third life. The method includes machining the C/C disk of the second thickness to remove a coating of the second ceramic solution from the wear surfaces of the C/C disk of the second thickness thereby forming a C/C disk of a third thickness and wherein the third thickness is less than the second thickness; pairing with and mechanically attaching the C/C disk of the third thickness with another C/C disk of the third thickness thereby forming a C/C split-disk of a fourth thickness, wherein the fourth thickness is greater than the third thickness; coating the wear surfaces of the C/C split-disk of the fourth thickness with a third ceramic solution, thereby forming a C/C split-disk of the fourth thickness coated with the third ceramic solution; and drying the C/C split-disk of the fourth thickness coated with the third ceramic solution.

In various embodiments, removing the coating of the second ceramic solution from the wear surfaces of the C/C disk of the second thickness further removes a portion of the C/C disk. In various embodiments, the third ceramic solution is applied to a wear surface of the C/C split-disk of the fourth thickness via at least one of spraying, painting, smearing, brushing, sorption, cold spraying, sputtering, pouring, sprinkling, peptization, or infiltration. In various embodiments, the third ceramic solution comprises at least one of nano ceramic binary oxide particulates, doped nano ceramic binary oxide particulates, or nano ceramic ternary oxide particulates.

Also disclosed herein a method for refurbishing a C/C split-disk of a fourth thickness and coated with a third ceramic solution for a fourth life. The method includes machining the C/C split-disk of the fourth thickness to remove a coating of the third ceramic solution from the wear surfaces of the C/C split-disk of the fourth thickness thereby forming a C/C split-disk of a fifth thickness and wherein the fifth thickness is less than the fourth thickness; coating the wear surfaces of the C/C split-disk of the fifth thickness with a fourth ceramic solution, thereby forming a C/C split-disk of the fifth thickness coated with the fourth ceramic solution; and drying the C/C split-disk of the fifth thickness coated with the fourth ceramic solution.

In various embodiments, removing the coating of the third ceramic solution from the wear surfaces of the C/C split-disk of the fourth thickness further removes a portion of the C/C split-disk. In various embodiments, the fourth ceramic solution is applied to a wear surface of the C/C split-disk of the fifth thickness via at least one of spraying, painting, smearing, brushing, sorption, cold spraying, sputtering, pouring, sprinkling, peptization, or infiltration. In various embodiments, the fourth ceramic solution comprises at least one of nano ceramic binary oxide particulates, doped nano ceramic binary oxide particulates, or nano ceramic ternary oxide particulates.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 4 illustrates a flowchart of a method for refurbishing a "thick" C/C disk coated with a ceramic solution for a second life, in accordance with various embodiments.

FIG. 5 illustrates a flowchart of a method for refurbishing a "thin" C/C disk coated with a ceramic solution for a third life, in accordance with various embodiments.

FIG. 6 illustrates a flowchart of a method for refurbishing a "thick" C/C split-disk coated with a ceramic solution for a fourth life, in accordance with various embodiments.

DETAILED DESCRIPTION

Figure 1:
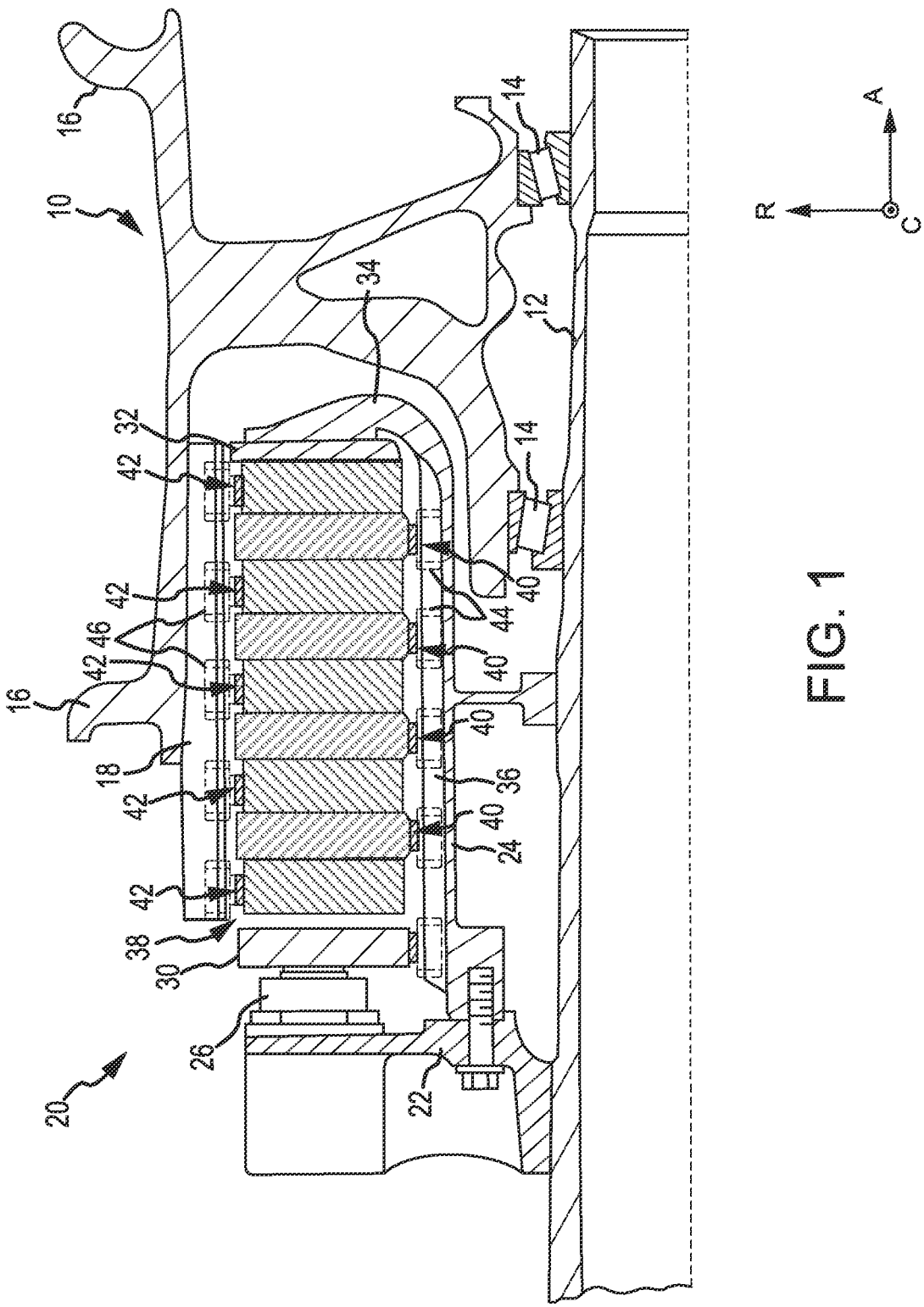
FIG. 1 illustrates a multi-disk brake system, in accordance with various embodiments.

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/ or any other possible attachment option. Further, any steps in a method discussed herein may be performed in any suitable order or combination.

By itself, carbon provides good wear resistance, but the addition of ceramic particulates to the C/C brakes may decrease wear rates and increase brake life. Provided herein, in accordance with various embodiments, are methods where a carbon/carbon (C/C) disk with a ceramic solution applied may be refurbished to extend refurbished brake stack or heat sink life without a need to produce a new brake stack or heat sink. In various embodiments, a C/C disk of a first thickness, i.e. a "thick" C/C disk, which has previously received a coating of the ceramic solution and is at an end of the C/C disk's first tour life ($1^{st}$ life), is received. In embodiments relating to C/C disks, as used herein, a "thick" C/C disk would have a thickness of between about 0.75 inches and about 2.0 inches, although preferably a thick C/C disk would have a thickness of between about 0.75 inch and about 1.5 inches. In various embodiments, the ceramic application, which was coated onto the "thick" C/C disk previously, is removed via machining thereby forming a new "thin" C/C disk of a second thickness that is less than the first thickness of the "thick" C/C disk and with no ceramic solution applied. In various embodiments, a "thin" C/C disk would have a thickness of between about 0.75 inches and about 1.75 inches. In various embodiments, the "thin" C/C disk is then applied with a new ceramic solution coating, thus forming a refurbished C/C disk with ceramic solution coating ($2^{nd}$ life). In various embodiments, a ceramic solution coating may be comprised of one or more of a nano ceramic binary oxide, a doped nano ceramic binary oxide, or a nano ceramic ternary oxide particulates which is suspended in a ceramic solution known as a "sol." In various embodiments, the sol may be applied via numerous routes like spraying, painting, smearing, brushing, sorption, cold spraying, sputtering, pouring, sprinkling, peptization, or infiltration, among others, but is generally applied in small quantities at the disk surfaces as a surface coating. In various embodiments, during the operation of the brake, the nano ceramic binary oxide, doped nano ceramic binary oxide, or nano ceramic ternary oxide is mixed into the carbon wear debris as its generated which then has the ability to drastically reduce wear rates and increase brake life. In various embodiments, in response to other carbon wear debris oxidizing away, the already oxidized ceramics remain, without needing to be regenerated like current wear debris and may regenerate carbon wear debris quickly to assist in brake lubrication.

In various embodiments, this refurbished "thin" C/C disk of the second thickness may be received for overhaul again and the sprayed on ceramic solution would be removed via machining. In various embodiments, the resulting "thinner" disk with a third thickness that is less than the second thickness may be paired with and mechanically attached to another overhauled "thinner" C/C disk to form a combined "thick" C/C split-disk of a fourth thickness that is greater than the third thickness. In various embodiments, a "thick" C/C split-disk would have a thickness of between about 1.0 inches and about 1.75 inches. In various embodiments, the combined "thick" C/C split-disk is then sprayed with a new ceramic solution coating, thus forming a refurbished combined "thick" C/C split-disk with ceramic solution coating ($3^{rd}$ life). In various embodiments, the refurbished combined "thick" C/C split-disk of the fourth thickness may be received for overhaul again and the sprayed on ceramic solution would be removed via machining, thereby forming a combined "thin" C/C split-disk of a fifth thickness that is less than the fourth thickness, which is sprayed with a new ceramic coating, thus forming a refurbished combined "thin" C/C split-disk (4$^{th}$ life). In various embodiments, a "thin" C/C split-disk would have a thickness of between about 0.8 inches and about 1.25 inches. If the refurbished combined "thin" C/C split-disk is received, the refurbished combined "thin" C/C split-disk is discarded.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof. Any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. The plurality of friction disks 38 includes at least one non-rotatable friction disk (stator) 40, and at least one rotatable friction disk (rotor) 42. Stators 40 may include a carbon/carbon (C/C) disk. Rotors 42 may include a carbon/carbon (C/C) disk. Each friction disk 38 includes an attachment structure. For example, stators 40 include a plurality of stator lugs 44 at circumferentially spaced positions around an inner circumference of stators 40, and rotors 42 include a plurality of rotor lugs 46 at circumferentially spaced positions around an outer circumference of rotors 42.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 may support the pressure plate 30 such that pressure plate 30 is also non-rotatable. Stator splines 36 also support the stators 40. Stators 40 engage stator splines 36 with gaps formed between stator lugs 44. Similarly, rotors 42 engage rotor splines 18 with gaps formed between rotor lugs 46. Thus, rotors 42 are rotatable by virtue of their engagement with rotor splines 18 of wheel 10.

In various embodiments, rotors 42 are arranged with end plate 32 on one end, pressure plate 30 on the other end, and stators 40 interleaved such that rotors 42 are adjacent to non-rotatable friction components. Pistons 26 are connected to torque flange 22 at circumferentially spaced positions around torque flange 22. Pistons 26 face axially toward wheel 10 and contact a side of pressure plate 30 opposite rotors 42. Pistons 26 may be powered electrically, hydraulically, or pneumatically. In response to actuation of pistons 26, a force towards reaction plate 34 is exerted on friction disks 38 such that rotors 42 and stators 40 are pressed together between pressure plate 30 and end plate 32.

Figure 2:
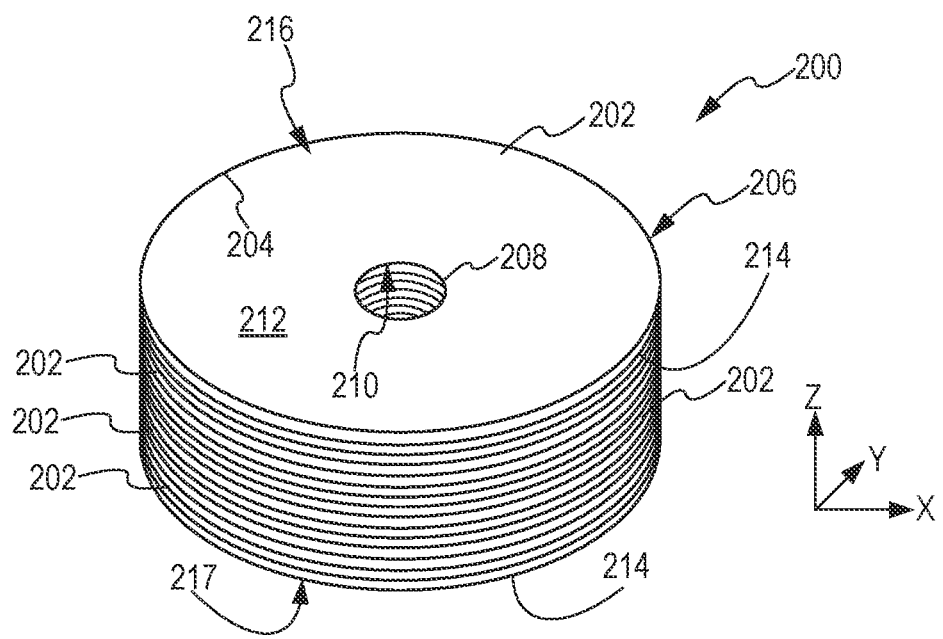
FIG. 2 illustrates a fibrous preform utilized to manufacture a carbon/carbon (C/C) disk, in accordance with various embodiments.

Referring now to FIG. 2, in accordance with various embodiments, a fibrous preform 200 utilized to manufacture a carbon/carbon (C/C) disk is illustrated. Fibrous preform 200 may be employed to form a stator 40 or a rotor 42, as described above. Fibrous preform 200 may comprise a porous structure comprised of a plurality of stacked textile layers 202. Each textile layer 202 having a thickness in a first dimension (i.e., the Z-direction) that may be substantially less than a thickness of the layer 202 in the other two dimensions (i.e., the X-direction and the Y-direction). As used herein, the "in-plane" direction refers to directions parallel to the thicker two dimensions (i.e., parallel to the X and Y directions and perpendicular to the Z-direction).

A porous structure may comprise any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 200 may be prepared by needling the textile layers 202 of fibrous preform 200. Needling the textile layers 202 of fibrous preform 200 tends to push fibers from one layer 202 to the next layer 202, thereby forming z-fibers that extend axially across the layers 202. Needling pulls fibers from the in-plane direction and forces the fibers into the z-fiber direction. After needling, fibrous preform 200 may comprise fibers extending in three different directions: the radial direction, the circumferential direction, and the axial direction (or the X, Y, and Z directions).

Fibrous preform 200 may be fabricated using a net shape preforming technology or may be cut from a needled board. Fibrous preform 200 may be a lay-up of woven, braided or knitted textile layers 202. The fibrous material may be in the form of chopped carbon fibers molded to form layers 202. Prior to the densification process, the fibrous material may be formed into a preform having any desired shape or form. For example, the fibrous preform may be in the form of a disk having any shape such as, for example, a polygon, a cylinder, a triangle, annular, square, rectangle, pentagon, hexagon, octagon, or the like. In various embodiments, layers 202 and fibrous preform 200 may have a generally annular shape. In accordance with various embodiments, the outer circumferential (or outer perimeter) surfaces 204 of layers 202 may form an outer diameter (OD) 206 of fibrous preform 200, and the inner circumferential (or inner perimeter) surfaces 208 of layers 202 may form an inner diameter (ID) 210 of fibrous preform 200. Each layer 202 includes a first axial face 212 and a second axial face 214 opposite the first axial face 212. First and second axial faces 212, 214 extend from outer circumferential surface 204 to inner circumferential surface 208. Layers 202 are stacked such that the first axial face 212 of one layer 202 is oriented toward the second axial face 214 of the adjacent layer 202. First axial face 212 of the uppermost layer 202 forms the upper axial end 216 of fibrous preform 200 and the second axial face 214 of the bottommost layer 202 forms the lower axial end 217 of fibrous preform 200 (i.e., the two layers 202 that are farther apart from one another in the axial direction form the axial ends 216, 217 of the fibrous preform).

Figure 3:
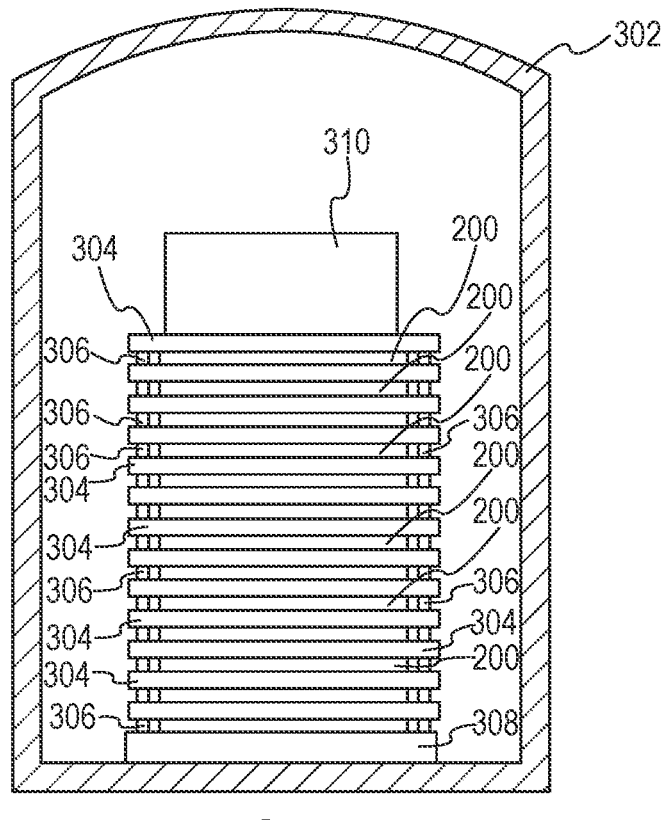
FIG. 3 illustrates a fibrous preform utilized to manufacture a carbon/carbon (C/C) disk in a carbonization furnace, in accordance with various embodiments.

As shown in FIG. 3, in accordance with various embodiments, fibrous preform 200 utilized to manufacture a carbon/carbon (C/C) disk being placed in a carbonization furnace 302 for carbonization is illustrated. The carbonization process may be employed to convert the fibers of the fibrous preforms 200 into pure carbon fibers, as used herein only "pure carbon fibers" means carbon fibers comprised of at least 99% carbon. The carbonization process is distinguished from the densification process described below in that the densification process involves infiltrating the pores of the fibrous preform 200 and depositing a matrix (e.g., carbon, phenolic resin, or any other desired matrix material)

within and around the carbon fibers of the fibrous preform, and the carbonization process refers to the process of converting the fibers of the fibrous preform 200 into pure carbon fibers.

In various embodiments, a plurality of fibrous preforms 200 may be placed on top of one another with separator plates 304 and spacing stops 306 disposed between adjacent fibrous preforms 200. For example, the bottommost fibrous preform 200 may be placed on a base plate 308 at the bottom of carbonization furnace 302. A separator plate 304 may be placed on top of the bottommost fibrous preform 200. Another fibrous preform 200 may then be placed on the separator plate 304, and another separator plate 304 may be placed on that fibrous preform 200. A stack of fibrous preforms 200 and separator plates 304 may be constructed in this manner, with each fibrous preform 200 being separated from superjacent and subjacent fibrous preforms 200 by separator plates 304. Spacing stops 306 may be placed between each of the separator plates 304. The spacing stops 306 may comprise a height that is less than the thickness of the fibrous preform 200 prior to carbonization. Spacing stops 306 may define a target thickness of the fibrous preform 200 after carbonization. In that regard, after the stack of fibrous preforms 200 is constructed, and before the carbonization process has started, gaps may exist between the spacing stops 306 and adjacent separator plates 304. During carbonization, a compressive load may be applied to the fibrous preforms 200, thereby compressing the fibrous preforms 200 until spacing stops 306 contact adjacent separator plates 304.

In various embodiments, compressive pressure may be applied to fibrous preforms 200 during the carbonization. The compressive pressure may be applied by placing a weight 310 over fibrous preforms 200, or by applying a compressive load to the fibrous preforms 200 by other suitable means. The compressive pressure may be applied along the direction of the z-fibers. It will be appreciated by those skilled in the art that the mass of weight 310 and/or the compressive force generated by weight 310 may vary depending on the size of fibrous preforms 200, the pre-carbonization fiber volume of fibrous preforms 200, the desired post-carbonization fiber volume of fibrous preforms 200, and/or the number fibrous preforms 200 being compressed. As used herein, "fiber volume" refers the percentage of the total volume of the fibrous preform that is formed by the fibers of the fibrous preform. For example, a fiber volume of 18% means the fibers of the fibrous preform form 18% of the total volume of fibrous preform. In various embodiments, after carbonization, fibrous preform 200 includes a fiber volume of between 10% and 50%. In various embodiments, after carbonization, fibrous preform 200 includes a fiber volume of between 15% and 25%. In various embodiments, fibrous preforms 200 having a low fiber volume may be desirable for the infiltration methods disclosed herein. In various embodiments, after carbonization, fibrous preform 200 may comprise a fiber volume of less than 25%. For example, in various embodiments, after carbonization, fibrous preform 200 may comprise a fiber volume of 21% or, in various embodiments, fibrous preform 200 may comprise a fiber volume of 18%. In various embodiments, the carbonized fibrous preform 200 is then densified via chemical vapor infiltration (CVI) with pyrolytic carbon at a predetermined temperature for a predetermined time interval as is known in the art, which results in a finished C/C disk.

Referring now to FIG. 4, in accordance with various embodiments, a flowchart of a method 400 for refurbishing a "thick" C/C disk coated with a ceramic solution applied to its wear surfaces for a second life is illustrated. In various embodiments, at block 402, a carbon/carbon (C/C) disk of a first thickness, i.e. a "thick" C/C disk, which is at an end of the C/C disk's first tour life (1$^{st}$ life) and that has previously received a coating of the ceramic solution to its wear surfaces, is received. In various embodiments, at block 404, the "thick" C/C disk is machined to remove the ceramic solution coating from the wear surfaces, which may also remove a portion of the "thick" C/C disk, thereby forming a carbon/carbon (C/C) disk of a second thickness, i.e. a "thin" C/C disk, where the second thickness is less than the first thickness. In various embodiments, at block 406 a new coating of the ceramic solution, i.e. nano ceramic binary oxide, doped nano ceramic binary oxide, or nano ceramic ternary oxide particulates suspended in a ceramic solution, referred to as a "sol," is applied to the wear surfaces of the "thin" C/C disk. In various embodiments, the particulates have an average particle size of between 10 nanometers (0.3937 microinch) and 250 nanometers (9.843 microinches). In various embodiments, the particulates have an average particle size of between 10 nanometers (0.3937 microinch) and 150 nanometers (5.906 microinches). In various embodiments, the particulates have an average particle size of between 10 nanometers (0.3937 microinch) and 50 nanometers (1.969 microinches). In various embodiments, the sol may be applied via numerous routes such as spraying, painting, smearing, brushing, sorption, cold spraying, sputtering, pouring, sprinkling, peptization, or infiltration, among others to physically coat the wear surface of the C/C disk. In various embodiments, the sol may be applied in small quantities at the disk wear surfaces like a surface coating. In that regard, in various embodiments, an amount of sol applied may be between 0.025 cubic centimeters (0.001526 cubic inches) and 3 cubic centimeters (0.1831 cubic inches) per unit of disk surface. In various embodiments, an amount of sol applied may be between 0.075 cubic centimeters (0.004577 cubic inches) and 2.5 cubic centimeters (0.1526 cubic inches) per disk surface. In that regard, in various embodiments, an amount of sol applied may be between 0.125 cubic centimeters (0.007628 cubic inches) and 2 cubic centimeters (0.122 cubic inches) per disk surface. In various embodiments, during the operation of the brake, the nano ceramic binary oxide, doped nano ceramic binary oxide, or nano ceramic ternary oxide is mixed into the carbon wear debris as its generated which then has the ability to drastically reduce wear rates and increase brake life. In various embodiments, in response to other carbon wear debris oxidizing away, the already oxidized ceramics remain, without needed to be regenerated like current wear debris coatings.

In various embodiments, the nano ceramic binary oxide particulates may include zirconium oxide ($ZrO_2$), aluminum oxide ($Al_2O_3$), or magnesium oxide (MgO), and various combinations of the same, among others. In various embodiments, the nano ceramic binary oxide particulates may include lithium oxide ($Li_2O$), beryllium oxide (BeO), calcium oxide (CaO), strontium oxide (SrO), or barium oxide (BaO), and various combinations of the same, among others. In various embodiments, the nano ceramic binary oxide particulates may include scandium (III) oxide ($Sc_2O_3$), yttrium oxide ($Y_2O_3$), cobalt (II) oxide (CoO), or nickel oxide (NiO), and various combinations of the same, among others. In various embodiments, the nano ceramic binary oxide particulates may include silicon oxide ($SiO_2$), titanium oxide ($TiO_2$), or hafnium (IV) oxide ($HfO_2$), and various combinations of the same, among others. In various embodiments, the nano ceramic binary oxide particulates may include vanadium (II) oxide (VO), vanadium (III) oxide ($V_2O_3$), vanadium oxide ($VO_2$), niobium (II) oxide (NbO), tantalum oxide ($Ta_2O_5$), tungsten (IV) oxide ($WO_2$), or tungsten trioxide ($WO_3$), and various combinations of the same, among others. In various embodiments, the nano ceramic binary oxide particulates may include gallium oxide (GaO), indium oxide ($In_2O_3$), or tin (IV) oxide ($SnO_2$), and various combinations of the same, among others. In various embodiments, the nano ceramic binary oxide particulates may include lanthanum oxide ($La_2O_3$), cerium oxide ($CeO_2$), praseodymium (III,IV) oxide ($Pr_6O_{11}$), or neodymium oxide ($Nd_2O_3$), and various combinations of the same, among others. In various embodiments, the nano ceramic binary oxide particulates may include samarium oxide ($Sm_2O_3$), europium oxide ($Eu_2O_3$), gadolinium oxide ($Gd_2O_3$), terbium oxide ($Tb_2O_3$), or dysprosium oxide ($Dy_2O_3$), and various combinations of the same, among others. In various embodiments, the nano ceramic binary oxide particulates may include holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$), and various combinations of the same, among others. In various embodiments, the doped nano ceramic binary oxide particulates may include yttrium oxide-stabilized zirconium (IV) oxide (YSZ) or zirconium (IV) oxide toughened aluminum oxide (ZTA), and various combinations of the same, among others. In various embodiments, the nano ceramic ternary oxide particulates may include lithium silicate ($Li_2SiO_3$), mullite ($Si_2Al_6O_{13}$), calcium silicate ($Ca_2SiO_4$), or hafnium ortho-silicate ($HfSiO_4$), and various combinations of the same, among others. In various embodiments, the nano ceramic ternary oxide particulates may include lithium titanate ($Li_2TiO_3$), aluminum titanate ($Al_2TiO_5$), calcium titanate ($CaTiO_3$), strontium titanate ($SrTiO_3$), barium titanate ($BaTiO_3$), or hafnium titanate ($HfTiO_4$), and various combinations of the same, among others. In various embodiments, the nano ceramic ternary oxide particulates may include strontium zirconate ($SrZrO_3$) or barium zirconate ($BaZrO_3$), and various combinations of the same, among others. In various embodiments, at block 408, the ceramic solution coated "thin" C/C disk may then be dried before being installed in a multi-disk brake system, such as the multi-disk brake mechanism 100 of FIG. 1, thereby starting its second life.

Referring now to FIG. 5, in accordance with various embodiments, a flowchart of a method 500 for refurbishing a "thin" C/C disk coated with a ceramic solution applied to its wear surfaces for a third life is illustrated. In various embodiments, at block 502, a carbon/carbon (C/C) disk of a second thickness, i.e. a "thin" C/C disk, which is at an end of the C/C disk's second tour life ($2^{nd}$ life) and that has previously received a coating of the ceramic solution to its wear surfaces, is received. In various embodiments, at block 504, the "thin" C/C disk is machined to remove the ceramic solution coating from the wear surfaces, which may also remove a portion of the "thin" C/C disk, thereby forming a carbon/carbon (C/C) disk of a third thickness, i.e. a "thinner" C/C disk, where the third thickness is less than the second thickness. In various embodiments, at block 506, the "thinner" disk is pair with and mechanically attached to another overhauled "thinner" C/C disk thereby forming a "thick" C/C split-disk of a fourth thickness that is greater than the third thickness. In various embodiments, at block 508 a new coating of the ceramic solution, i.e. the ceramic solution described previously with regard to FIG. 4, is applied to wear surfaces of the "thick" C/C split-disk. In various embodiments, at block 510, the ceramic solution coated "thick" C/C split-disk may then be dried before being installed in a multi-disk brake system, such as the multi-disk brake mechanism 100 of FIG. 1 thereby starting its third life.

Referring now to FIG. 6, in accordance with various embodiments, a flowchart of a method 600 for refurbishing a "thick" C/C split-disk coated with a ceramic solution applied to its wear surfaces for a fourth life is illustrated. In various embodiments, at block 602, a carbon/carbon (C/C) disk of a fourth thickness, i.e. a "thick" C/C split-disk, which is at an end of the C/C disk's third tour life ($3^{rd}$ life) and that has previously received a coating of the ceramic solution to its wear surfaces, is received. In various embodiments, at block 604, the "thick" C/C split-disk is machined to remove the ceramic solution coating from the wear surfaces, which may also remove a portion of the "thick" C/C split-disk, thereby forming a carbon/carbon (C/C) disk of a fifth thickness, i.e. a "thin" C/C split-disk, where the fifth thickness is less than the fourth thickness. In various embodiments, at block 606 a new coating of the ceramic solution, i.e. the ceramic solution described previously with regard to FIG. 4, is applied to wear surfaces of the "thin" C/C split-disk. In various embodiments, at block 608, the ceramic solution coated "thin" C/C split-disk may then be dried before being installed in a multi-disk brake system, such as the multi-disk brake mechanism 100 of FIG. 1 thereby starting its fourth life.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for refurbishing a C/C disk of a first thickness and coated with a first ceramic solution for a second life, comprising:

machining the C/C disk of the first thickness to remove a coating of the first ceramic solution from the wear surfaces of the C/C disk of the first thickness thereby forming a C/C disk of a second thickness and wherein the second thickness is less than the first thickness, wherein removing the coating of the first ceramic solution from the wear surfaces of the C/C disk of the first thickness further removes a portion of the C/C disk;

coating the wear surfaces of the C/C disk of the second thickness with a second ceramic solution, thereby forming a C/C disk of the second thickness coated with the second ceramic solution; and drying the C/C disk of the second thickness coated with the second ceramic solution.

2. The method of claim 1, wherein the second ceramic solution is applied to a wear surface of the C/C disk of the second thickness via at least one of spraying, painting, smearing, brushing, sorption, cold spraying, sputtering, pouring, sprinkling, peptization, or infiltration.

3. The method of claim 1, wherein the second ceramic solution comprises at least one of nano ceramic binary oxide particulates, doped nano ceramic binary oxide particulates, or nano ceramic ternary oxide particulates.

4. The method of claim 3, wherein the nano ceramic binary oxide particulates comprise at least one of zirconium dioxide ($ZrO_2$), aluminum oxide ($Al_2O_3$), or magnesium oxide (MgO).

5. The method of claim 3, wherein the nano ceramic binary oxide particulates comprise at least one of lithium oxide ($Li_2O$), beryllium oxide (BeO), calcium oxide (CaO), strontium oxide (SrO), or barium oxide (BaO).

6. The method of claim 3, wherein the nano ceramic binary oxide particulates comprise at least one of scandium (III) oxide ($Sc_2O_3$), yttrium oxide ($Y_2O_3$), cobalt (II) oxide (CoO), or nickel oxide (NiO).

7. The method of claim 3, wherein the nano ceramic binary oxide particulates comprise at least one of silicon oxide ($SiO_2$), titanium oxide ($TiO_2$), zirconium oxide ($ZrO_2$), or hafnium (IV) oxide ($HfO_2$).

8. The method of claim 3, wherein the nano ceramic binary oxide particulates comprise at least one of vanadium (II) oxide (VO), vanadium (III) oxide ($V_2O_3$), vanadium oxide ($VO_2$), niobium (II) oxide (NbO), tantalum oxide ($Ta_2O_5$), tungsten (IV) oxide ($WO_2$), or tungsten trioxide ($WO_3$).

9. The method of claim 3, wherein the nano ceramic binary oxide particulates comprise at least one of, gallium oxide (GaO), indium oxide ($In_2O_3$), or tin (IV) oxide ($SnO_2$).

10. The method of claim 3, wherein the nano ceramic binary oxide particulates comprise at least one of lanthanum oxide ($La_2O_3$), cerium dioxide ($CeO_2$), praseodymium (III, IV) oxide ($Pr_6O_{11}$), or neodymium oxide ($Nd_2O_3$).

11. The method of claim 3, wherein the nano ceramic binary oxide particulates comprise at least one of samarium oxide ($Sm_2O_3$), europium oxide ($Eu_2O_3$), gadolinium oxide ($Gd_2O_3$), terbium oxide ($Tb_2O_3$), or dysprosium oxide ($Dy_2O_3$).

12. The method of claim 3, wherein the nano ceramic binary oxide particulates comprise at least one of holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$).

13. The method of claim 3, wherein the doped nano ceramic binary oxide particulates comprise at least one of yttrium oxide stabilized zirconium (IV) oxide (YSZ) or zirconium (IV) oxide toughened aluminum oxide (ZTA).

14. The method of claim 3, wherein the nano ceramic ternary oxide particulates comprise at least one of lithium silicate ($Li_2SiO_3$), mullite ($Si_2Al_6O_{13}$), calcium silicate ($Ca_2SiO_4$), or hafnium orthosilicate ($HfSiO_4$).

15. The method of claim 3, wherein the nano ceramic ternary oxide particulates comprise at least one of lithium titanate ($Li_2TiO_3$), aluminum titanate ($Al_2TiO_5$), calcium titanate ($CaTiO_3$), strontium titanate ($SrTiO_3$), barium titanate ($BaTiO_3$), or hafnium titanate ($HfTiO_4$).

16. The method of claim 3, wherein the nano ceramic ternary oxide particulates comprise at least one of strontium zirconate ($SrZrO_3$) or barium zirconate ($BaZrO_3$).

17. A method for refurbishing a C/C disk of a second thickness and coated with a second ceramic solution for a third life, comprising:

machining the C/C disk of the second thickness to remove a coating of the second ceramic solution from the wear surfaces of the C/C disk of the second thickness thereby forming a C/C disk of a third thickness and wherein the third thickness is less than the second thickness;

pairing with and mechanically attaching the C/C disk of the third thickness with another C/C disk of the third thickness thereby forming a C/C split-disk of a fourth thickness, wherein the fourth thickness is greater than the third thickness;

coating the wear surfaces of the C/C split-disk of the fourth thickness with a third ceramic solution, thereby forming a C/C split-disk of the fourth thickness coated with the third ceramic solution; and drying the C/C split-disk of the fourth thickness coated with the third ceramic solution.

18. The method of claim 17, wherein removing the coating of the second ceramic solution from the wear surfaces of the C/C disk of the second thickness further removes a portion of the C/C disk, wherein the third ceramic solution is applied to a wear surface of the C/C split-disk of the fourth thickness via at least one of spraying, painting, smearing, brushing, sorption, cold spraying, sputtering, pouring, sprinkling, peptization, or infiltration, and wherein the third ceramic solution comprises at least one of nano ceramic binary oxide particulates, doped nano ceramic binary oxide particulates, or nano ceramic ternary oxide particulates.

19. A method for refurbishing a C/C split-disk of a fourth thickness and coated with a third ceramic solution for a fourth life, comprising:

machining the C/C split-disk of the fourth thickness to remove a coating of the third ceramic solution from the wear surfaces of the C/C split-disk of the fourth thickness thereby forming a C/C split-disk of a fifth thickness and wherein the fifth thickness is less than the fourth thickness, wherein removing the coating of the third ceramic solution from the wear surfaces of the C/C split disk of the fourth thickness further removes a portion of the C/C split-disk;

coating the wear surfaces of the C/C split-disk of the fifth thickness with a fourth ceramic solution, thereby forming a C/C split-disk of the fifth thickness coated with the fourth ceramic solution; and drying the C/C split-disk of the fifth thickness coated with the fourth ceramic solution.

20. The method of claim 19, wherein the fourth ceramic solution is applied to a wear surface of the C/C split-disk of the fifth thickness via at least one of spraying, painting, smearing, brushing, sorption, cold spraying, sputtering, pouring, sprinkling, peptization, or infiltration, and wherein the fourth ceramic solution comprises at least one of nano ceramic binary oxide particulates, doped nano ceramic binary oxide particulates, or nano ceramic ternary oxide particulates.

* * * * *